United States Patent
Nishii

(10) Patent No.: US 10,656,890 B2
(45) Date of Patent: May 19, 2020

(54) IMAGE FORMING APPARATUS, STORAGE MEDIUM, AND CONTROL METHOD

(71) Applicant: SHARP KABUSHIKI KAISHA, Sakai, Osaka (JP)

(72) Inventor: Yuichi Nishii, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/262,313

(22) Filed: Jan. 30, 2019

(65) Prior Publication Data

US 2019/0243591 A1 Aug. 8, 2019

(30) Foreign Application Priority Data

Feb. 7, 2018 (JP) ................. 2018-019736

(51) Int. Cl.
  *H04N 1/00* (2006.01)
  *G06F 3/12* (2006.01)
  *H04N 1/21* (2006.01)

(52) U.S. Cl.
  CPC .......... *G06F 3/1273* (2013.01); *G06F 3/1207* (2013.01); *G06F 3/1285* (2013.01); *G06F 3/1287* (2013.01); *H04N 1/21* (2013.01)

(58) Field of Classification Search
  CPC ..... G06F 3/1207; G06F 3/1287; G06F 3/1273
  USPC .......................................... 358/1.15
  See application file for complete search history.

(56) References Cited

U.S. PATENT DOCUMENTS

| 2007/0133054 | A1 | 6/2007 | Kobayashi et al. |
| 2008/0204791 | A1* | 8/2008 | Yusa ............ H04N 1/2179 358/1.15 |
| 2008/0212131 | A1* | 9/2008 | Osada ............ G06F 3/1207 358/1.15 |

FOREIGN PATENT DOCUMENTS

JP 2007-166178 A 6/2007

* cited by examiner

*Primary Examiner* — Saeid Ebrahimi Dehkordy
(74) *Attorney, Agent, or Firm* — ScienBiziP, P.C.

(57) ABSTRACT

An information processing system includes a server and an image forming apparatus. The image forming apparatus includes an image forming unit, an image reading unit, and the like, and executes a job of copy, transmission or reception of an electronic mail, print, FAX transmission, or the like in accordance with an operation of a user. In the image forming apparatus, in a case where a plurality of jobs are simultaneously executed, history information that includes log information of each of the plurality of jobs and image data corresponding to an image handled by the job is generated.

7 Claims, 11 Drawing Sheets

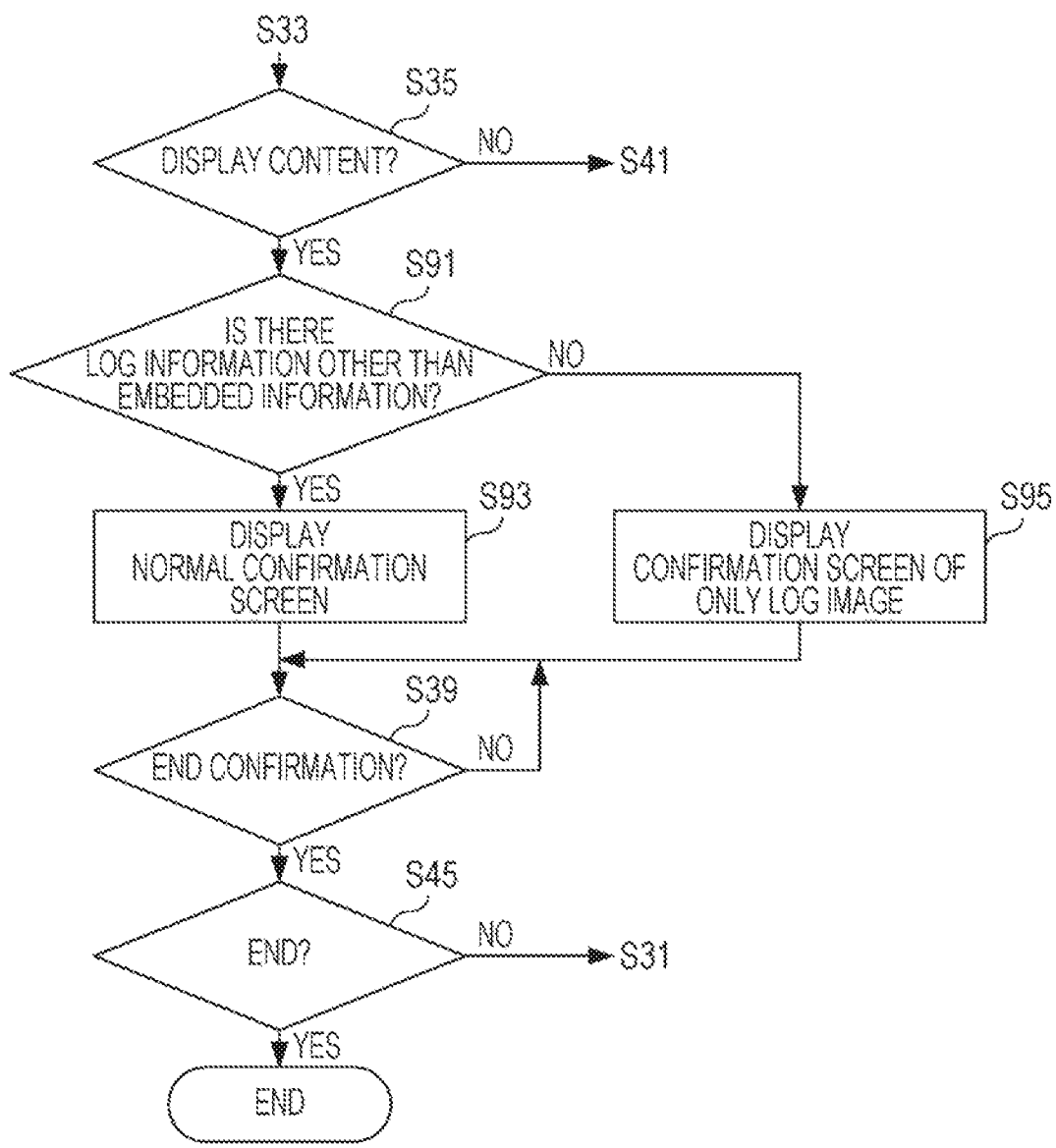

IMAGE FORMING APPARATUS, STORAGE MEDIUM, AND CONTROL METHOD

BACKGROUND

1. Field

The present disclosure relates to an image forming apparatus, a storage medium, and a control method, and particularly relates to an image forming apparatus, a storage medium, and a control method that generate a job log of a job after execution of the job, for example.

2. Description of the Related Art

An example of such a kind of a related art is disclosed in Japanese Unexamined Patent Application Publication No. 2007-166178. A multifunction peripheral according to the related art generates a job log after execution of a job, creates a log image from an image handled by the job, and stores the log image in a log image storage unit in association with the job log.

In the multifunction peripheral according to the related art, in a case where a plurality of jobs are simultaneously executed, a common log image is associated with a plurality of job logs corresponding to the plurality of jobs.

In the multifunction peripheral according to the related art, however, in a case where the plurality of jobs are simultaneously executed, the log image for a common image is created, so that the same log image is created even when the jobs have different contents, and a product of a job and the log image may not be matched. When the product of the job and the log image are not matched, there is a problem that a leak source of information is difficult to be specified.

Thus, the disclosure provides an image forming apparatus, a storage medium, and a control method that are new.

The disclosure also provides an image forming apparatus, a storage medium, and a control method in which, in a case where a plurality of jobs are simultaneously executed, log information is appropriately generated for each of the jobs and a leak source of information is easily specified.

SUMMARY

The disclosure provides an image forming apparatus that includes a job execution unit capable of executing a plurality of types of jobs and a history information generation unit. In a case where a plurality of jobs are simultaneously executed in the job execution unit, the job history information generation unit generates history information that corresponds to each of the plurality of jobs and includes a log image and log information corresponding to the log image.

The disclosure provides a storage medium storing a control program of an image forming apparatus that includes a job execution unit capable of executing a plurality of types of jobs, and the control program causes a processor of the image forming apparatus to function as a history information generation unit that, in a case where a plurality of jobs are simultaneously executed in the job execution unit, generates history information that corresponds to each of the plurality of jobs and includes a log image and log information corresponding to the log image.

The disclosure provides a control method of an image forming apparatus that includes a job execution unit capable of executing a plurality of types of jobs, and the control method includes (a) in a case where a plurality of jobs are simultaneously executed in the job execution unit, generating history information that corresponds to each of the plurality of jobs and includes a log image and log information corresponding to the log image.

BRIEF DESCRIPTION OF THE DRAWINGS

FIG. 16 is a flowchart illustrating an example of job log management processing in the second exemplary embodiment.

DESCRIPTION OF THE EMBODIMENTS

[First Exemplary Embodiment]

Figure 1:
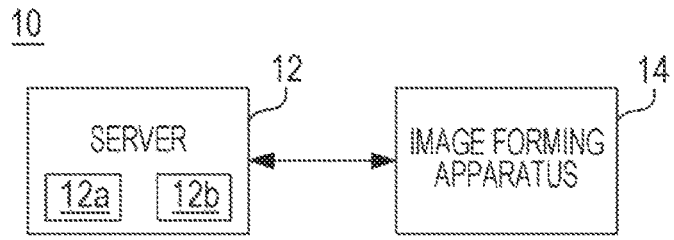
FIG. 1 illustrates an example of a configuration of an information processing system of the disclosure.

FIG. 1 illustrates an example of a configuration of an information processing system 10 of the disclosure. With reference to FIG. 1, the information processing system 10 that is the first exemplary embodiment of the disclosure includes a server 12, and the server 12 is connected to an image forming apparatus 14 so as to be able to perform communication through a network such as the Internet or a LAN.

Note that, though one image forming apparatus 14 is illustrated in FIG. 1, two or more image forming apparatuses 14 may be provided.

The server 12 is a general-purpose server and includes components such as a CPU 12a, a RAM 12b, and a communication module. The server 12 includes a storage unit constituted by a non-volatile memory such as an HDD, an SSD, a flash memory, or an EEPROM.

The image forming apparatus 14 is an MFP (Multifunction Peripheral) that includes a copy function, a printer function, a scanner function, a facsimile (FAX) function, an internet FAX (I-FAX) function, an electronic mail function, or the like. Note that, the disclosure may include at least two or more functions among the plurality of functions described above, and is applicable not only to the multifunction peripheral but also to another image forming apparatus such as a copying machine (copier), a printing apparatus (printer), or a facsimile apparatus (FAX apparatus).

Figure 2:
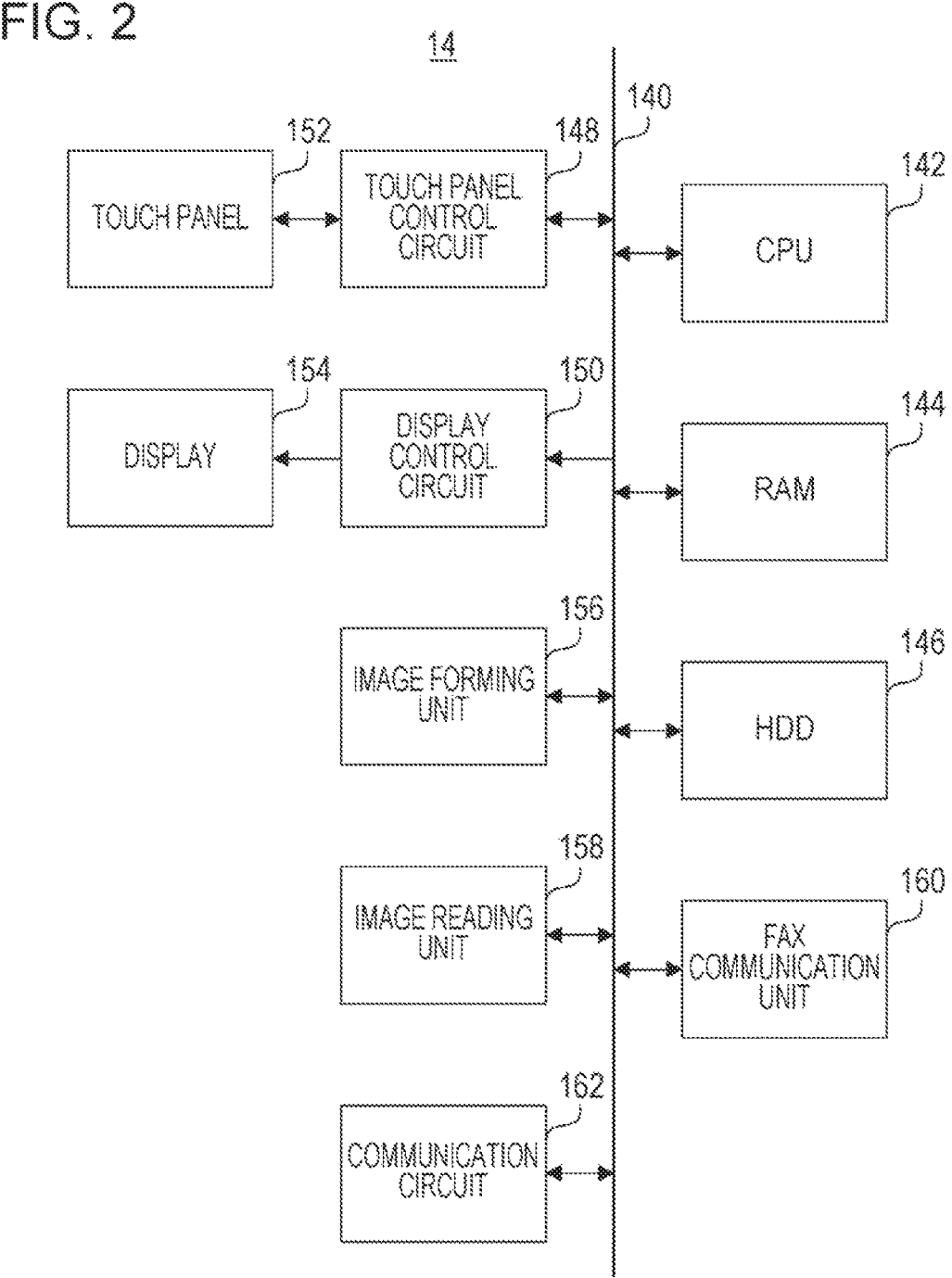
FIG. 2 is a block diagram illustrating an electric configuration of an image forming apparatus illustrated in FIG. 1.

FIG. 2 is a block diagram illustrating an electric configuration of the image forming apparatus 14 illustrated in FIG. 1. With reference to FIG. 2, the image forming apparatus 14 includes a CPU 142. To the CPU 142, a RAM 144, an HDD 146, a touch panel control circuit 148, a display control circuit 150, an image forming unit 156, an image reading unit 158, a FAX communication unit 160, and a communication circuit 162 are connected through a bus 140. A touch panel 152 is connected to the touch panel control circuit 148 and a display 154 is connected to the display control circuit 150. As the display 154, for example, an LCD, an EL (Electro-Luminescence) display, or the like is usable. In the first exemplary embodiment, as the touch panel 152, a touch panel of an electrostatic capacitive system is used and the touch panel 152 is provided on a display surface of the display 154. However, a touch panel display in which the touch panel 152 and the display 154 are integrally formed may be used. The touch panel 152 is not necessarily limited to one of the electrostatic capacitive system and one of any system such as an electromagnetic induction system, a resistance film system, or an infrared system may be used.

The CPU 142 controls the entire image forming apparatus 14. The RAM 144 is used as a work area and a buffer area of the CPU 142.

The touch panel control circuit 148 applies a desired voltage or the like to the touch panel 152 and, when a touch operation (touch input) within a touch effective range is detected in the touch panel 152, the touch panel control circuit 148 outputs, to the CPU 142, touch coordinate data indicating a position of the detected touch input.

The display control circuit 150 includes a GPU, a VRAM, and the like, and under an instruction of the CPU 142, by using image generation data 74b (refer to FIG. 10) stored in the RAM 144, the GPU generates, in the VRAM, display image data to display various screens on the display 154 and outputs the generated display image data to the display 154. As an example, on the display 154, a screen such as a home screen 100 (refer to FIG. 5 or the like) that is an operation screen to select a desired job among various jobs corresponding to functions that are able to be executed by the image forming apparatus 14 is displayed. In the first exemplary embodiment, however, a job means copying (including scanning of an original document), transmission or reception of an electronic mail, printing, transmission of FAX, or the like.

The image reading unit 158 includes a light source, a plurality of mirrors, an image forming lens, a line sensor, and the like. The image reading unit 158 exposes a surface of an original document by the light source and guides reflected light, which is reflected from the surface of the original document, to the image forming lens by the plurality of mirrors. Then, an image of the reflected light is formed on a light receiving element of the line sensor by the image forming lens. In the line sensor, luminance and chromaticity of the reflected light whose image is formed on the light receiving element are detected and read image data is generated on the basis of an image of the surface of the original document.

The image forming unit (printing apparatus) 156 is a general-purpose laser printer and includes a photoreceptor, a charger, an exposure device, a developing device, a transfer device, a fixing device, and the like and prints, on a recording sheet (sheet) or the like, an image corresponding to print data which is processed by an image processing circuit. Note that, the image forming unit 156 may be constituted by a sublimation printer or an inkjet printer instead of the laser printer.

The FAX communication unit 160 includes a facsimile modem (FAX modem) and a network control unit (NCU) and is connected to a public communication line, such as a PSTN (Public Switched Telephone Networks), through a telephone line, a line exchanger, or the like. The FAX modem modulates, in accordance with a standard of facsimile communication (FAX communication), transmission image data, which is coded, into an analog signal of a format suitable for transmission by the public switched telephone network and demodulates an analog signal from another FAX apparatus to acquire reception image data. The network control unit performs line control to close or open the public switched telephone network and connects the FAX modem to the public switched telephone network. The network control unit also performs transmission or reception of image data, a control signal, or the like in accordance with a predefined protocol of FAX communication and performs automatic call originating processing and automatic incoming call processing in FAX communication.

The communication circuit 162 is a communication circuit for connection to a network such as the Internet. The communication circuit 162 is a wired communication circuit or a wireless communication circuit and communicates with an external computer, such as the server 12 or another image forming apparatus, through the network. The communication circuit 162 is also a communication circuit by which transmission or reception of electronic mail data, transmission or reception of I-FAX, or the like is performed via the network.

Note that, the electric configuration of the image forming apparatus 14 illustrated in FIG. 2 is merely an example and is not necessarily limited thereto. For example, in the image forming apparatus 14, as a different input unit, an operation button of hardware such as an operation panel is provided or a keyboard of hardware is connected in some cases. In the image forming apparatus 14, an attachment part (for example, a drive or a memory slot) that is used to attach various recording media is provided in some cases. Examples of various recording media include an optical disc (for example, such as a CD-R, a DVD-R, or a BD-R) and a flash memory (for example, such as a USB memory, an SD memory card, or a memory stick). In this case, the optical disc is attached to the drive. The flash memory is attached to the memory slot.

In a conventional information processing system with such a configuration, there is a case where history information (job log) of a job is generated after execution of the job, a log image is created from an image handled by the job, and the log image is stored in a storage unit in association with the job log. In the conventional information processing system, in a case where a plurality of jobs are simultaneously executed, a common log image is associated with a plurality of job logs corresponding to the plurality of jobs.

In the conventional information processing system, however, in a case where the plurality of jobs are simultaneously executed, the common log image is created correspondingly to the plurality of job logs, so that the same log image is created even when the jobs have different contents, and a product of each of the jobs and the log image are not matched and a leak source of information may be difficult to be specified.

Thus, in the information processing system 10 of the first exemplary embodiment, in a case where a plurality of jobs are simultaneously executed in the image forming apparatus 14, a job log that corresponds to each of the plurality of jobs and includes a log image and log information corresponding to the log image is generated.

Figure 3:
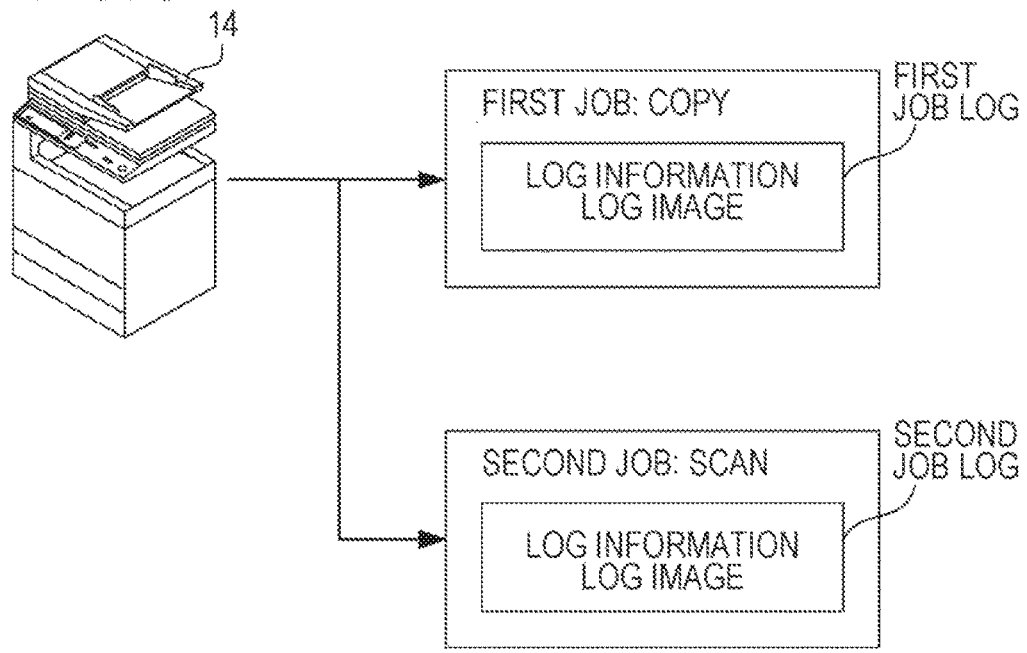
FIG. 3 is an explanatory diagram for explaining an operation example of the information processing system.
Figure 4:
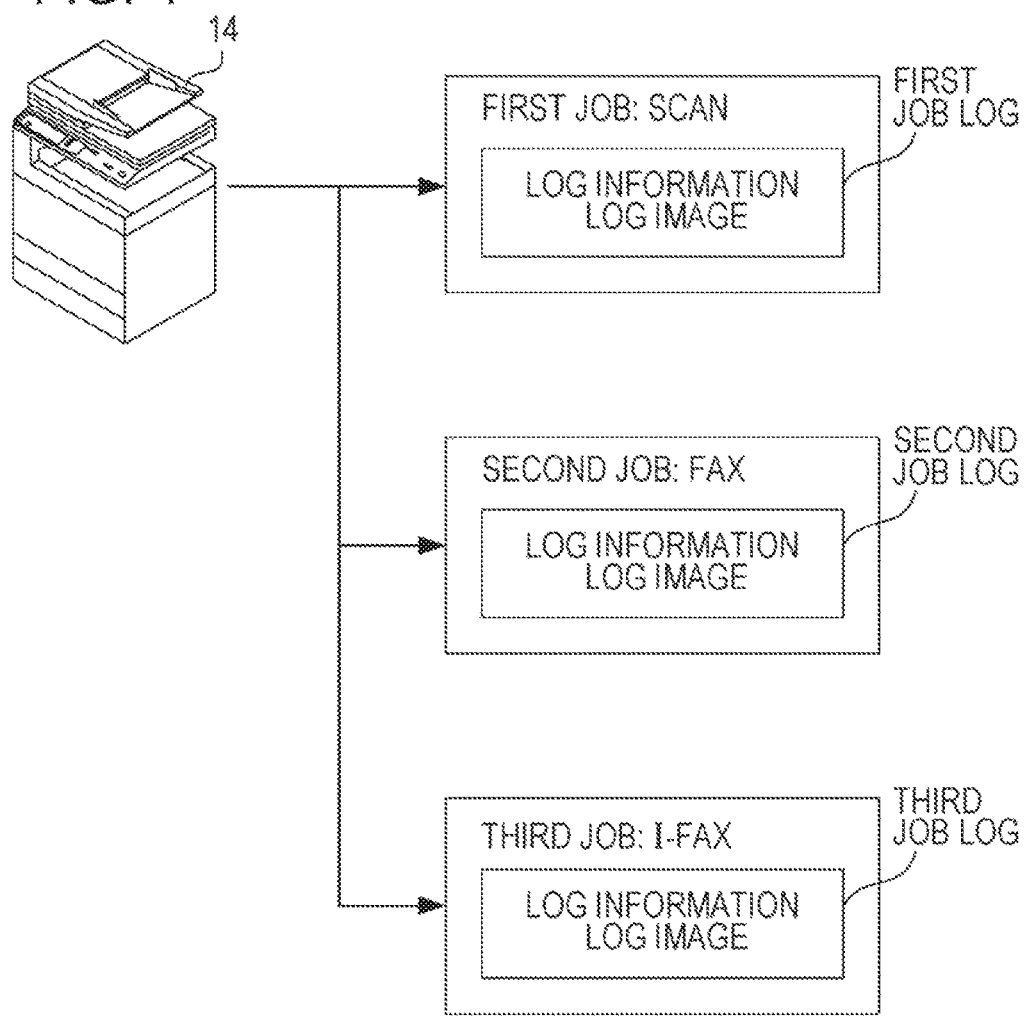
FIG. 4 is an explanatory diagram for explaining another operation example of the information processing system.
Figure 5:
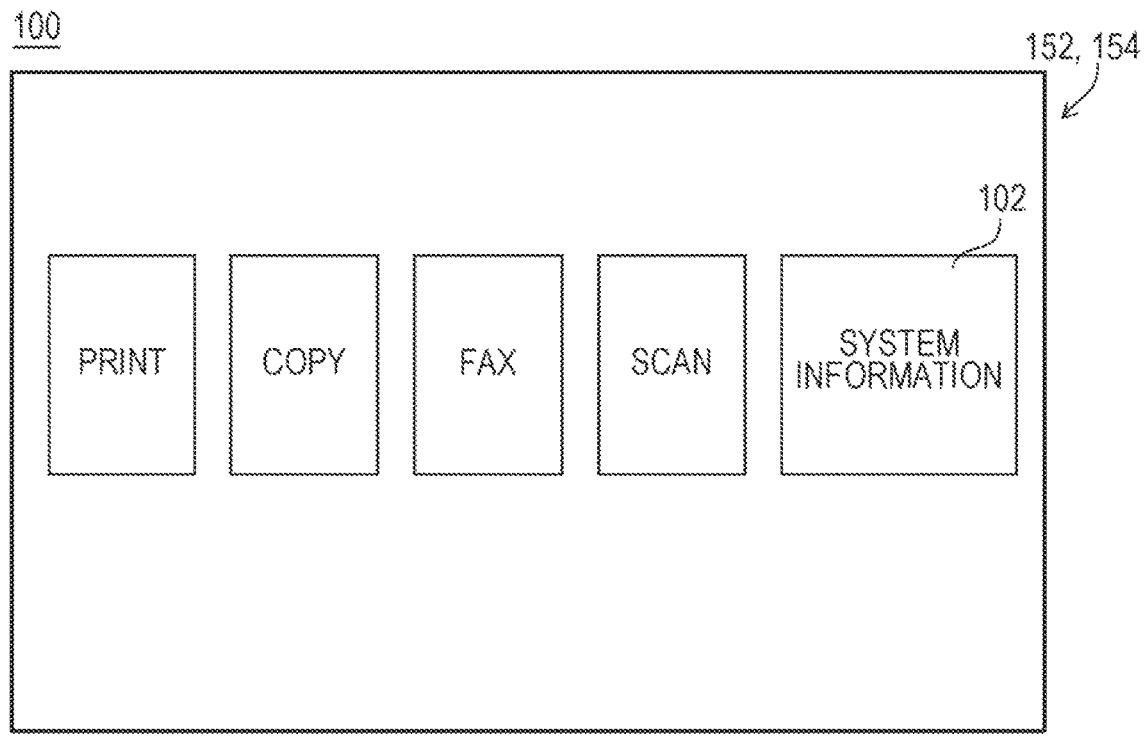
FIG. 5 is an explanatory diagram illustrating an example of a home screen of the image forming apparatus.
Figure 6:
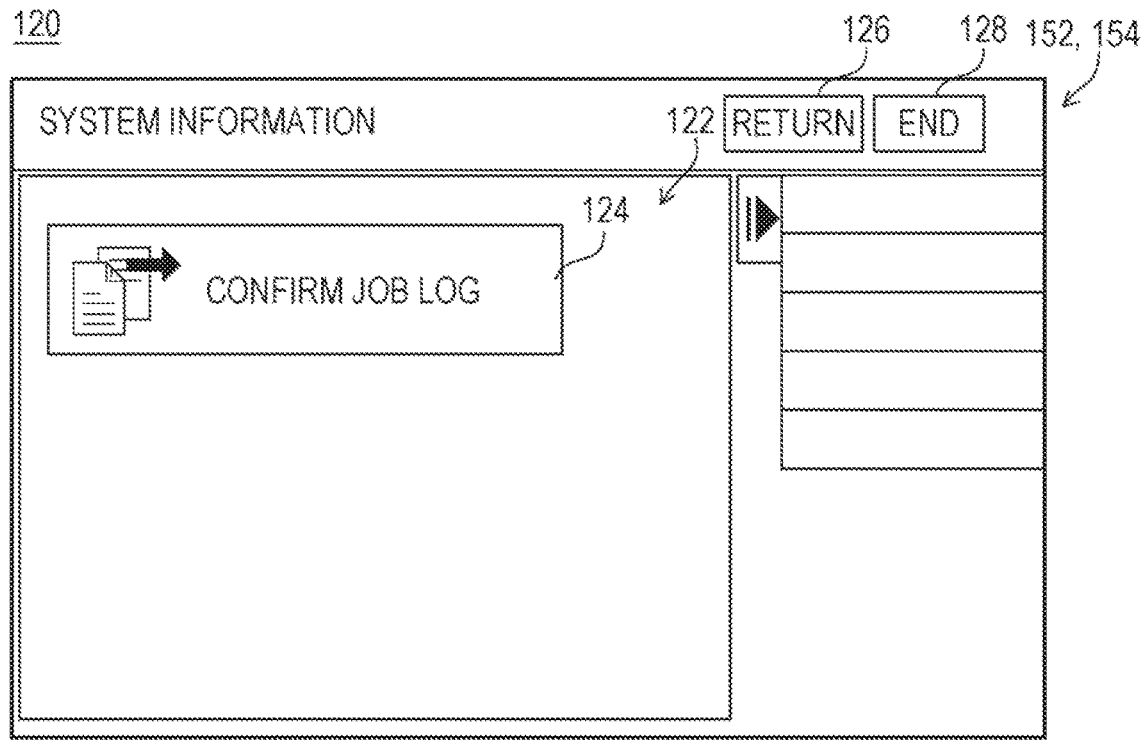
FIG. 6 is an explanatory diagram illustrating an example of a first selection screen of the image forming apparatus.
Figure 7:
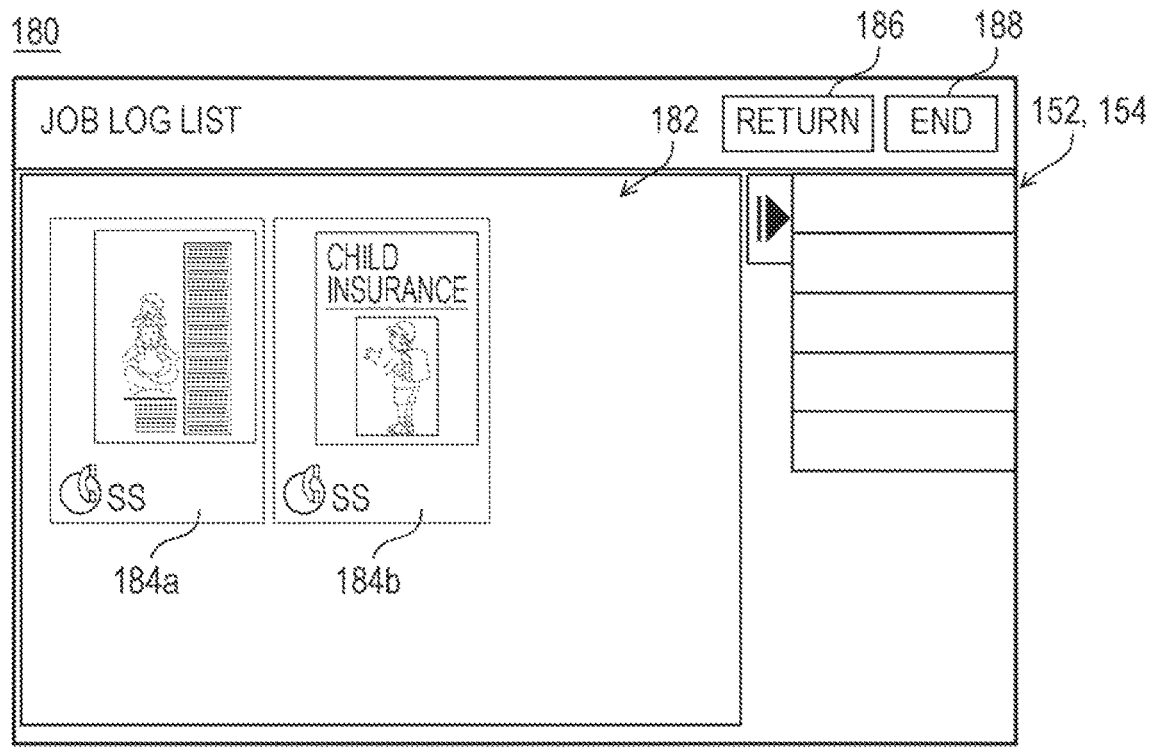
FIG. 7 is an explanatory diagram illustrating an example of a second selection screen of the image forming apparatus before a job log is selected.
Figure 8:
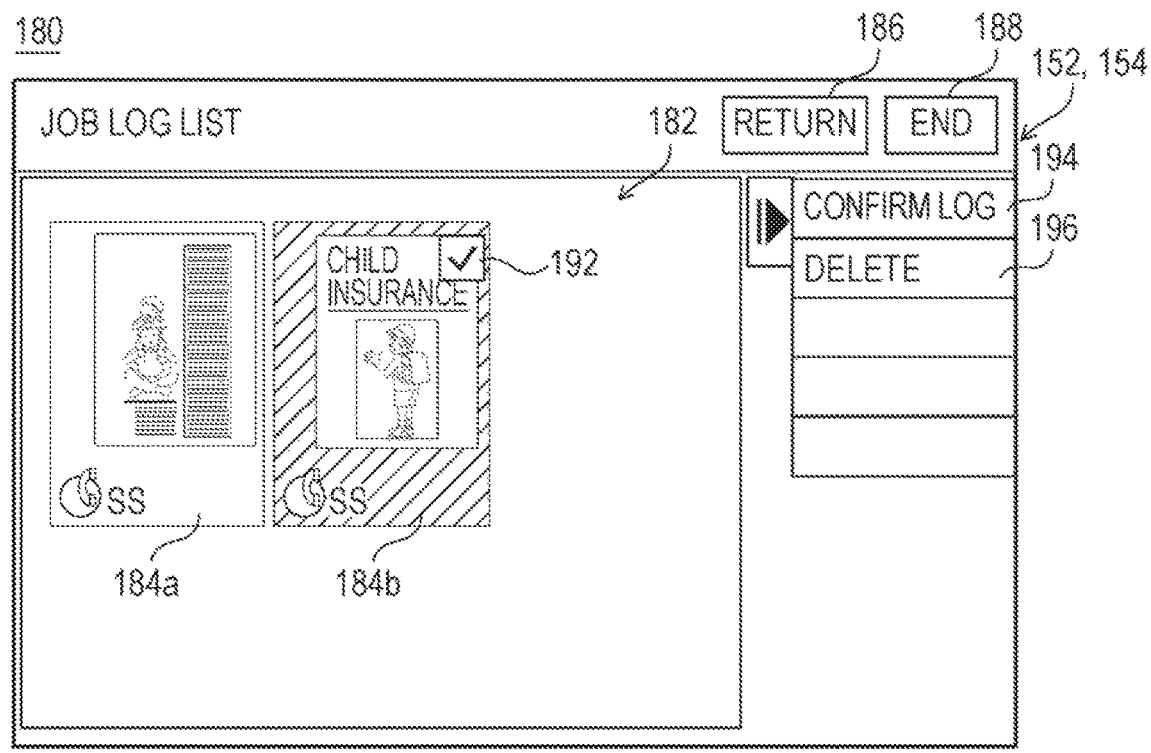
FIG. 8 is an explanatory diagram illustrating an example of the second selection screen of the image forming apparatus after a job log is selected.
Figure 9:
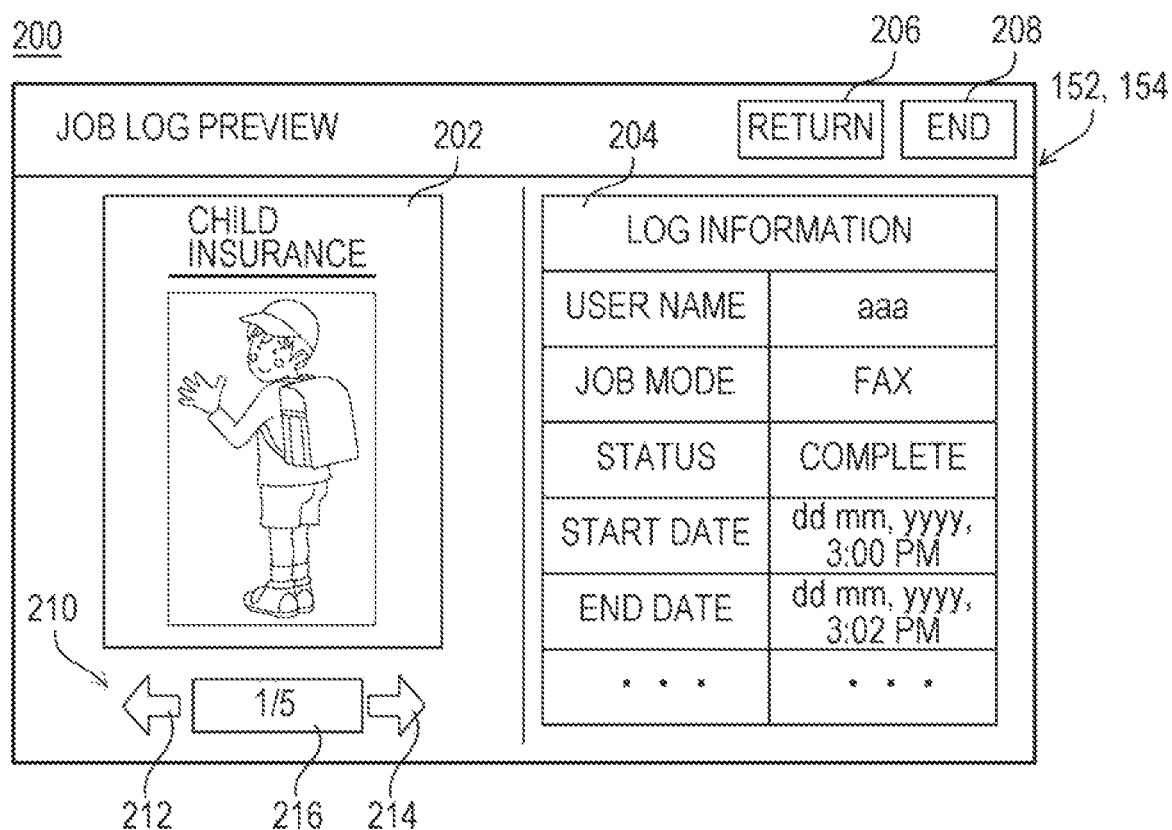
FIG. 9 is an explanatory diagram illustrating an example of a confirmation screen of the image forming apparatus.

An operation example of the information processing system 10 will be described below with reference to FIG. 3 and the like. FIG. 3 is an explanatory diagram for explaining an operation example of the information processing system 10. FIG. 4 is an explanatory diagram for explaining another operation example of the information processing system 10. FIG. 5 is an explanatory diagram illustrating an example of a home screen 100 of the image forming apparatus 14. FIG. 6 is an explanatory diagram illustrating an example of a first selection screen 120 of the image forming apparatus 14. FIG. 7 is an explanatory diagram illustrating an example of a second selection screen 180 of the image forming apparatus 14 before a job log is selected. FIG. 8 is an explanatory diagram illustrating an example of the second selection screen 180 of the image forming apparatus 14 after the job log is selected. FIG. 9 is an explanatory diagram illustrating an example of a confirmation screen 200 of the image forming apparatus 14.

The image forming apparatus 14 of the information processing system 10 is able to execute a copy job, a print job, a scan job, a FAX job, an I-FAX job, and the like. Note that, the scan job includes a document filing mode (mode in which a scanned image is stored in a storage device inside the image forming apparatus 14, or an external device, such as a recording medium or the server 12, which is connected to the image forming apparatus 14) and a mail mode (a mode in which a scanned image is transmitted to a given destination with a format of being attached to an electronic mail). For example, a user is able to instruct execution after operating (touching) the touch panel 152 or the like, selecting a desired job, and setting a detailed condition (job condition). In this case, the image forming apparatus 14 executes each job in accordance with the instruction of the user. When an electronic mail, data related to a print job, data related to a FAX job, or the like is received from outside through the communication circuit 162, the image forming apparatus 14 executes each job in accordance with the received data.

Note that, the image forming apparatus 14 is able to simultaneously receive (register) a plurality of jobs and simultaneously execute the plurality of jobs that are simultaneously received.

For example, there is a case where a copy job (first job) and a scan job (second job) are simultaneously executed as illustrated in FIG. 3. In this case, it is assumed that the copy job and the scan job are executed on the basis of the same original document. The same is also applied to the example of FIG. 4 described below. In this case, for each of the copy job and the scan job, a job log that includes a log image corresponding to an image handled by each of the jobs and log information corresponding to the log image is generated.

Note that, each of log image data corresponding to the log image and log information data (text data) corresponding to the log information is generated in a file format that is designated in advance. For example, the file format of the log image data includes various formats such as a PDF (Portable Document Format), a JPEG, and a TIFF. The file format of the log information data includes various formats such as an XML format, a CSV format, a TSV format, and an HTML format.

The log information includes identification information (ID) of the image forming apparatus 14 in which a job is executed, a job ID of the job, a type (job mode) of the job, a job execution user name, a job reception time, a job start time, a job end time, and information of a status (operations state) such as job standby, job under processing, job stop, job completion, the number of output sheets of the job, or an error type of the job.

The log image is an image processed for each of the jobs in accordance with a predetermined log image generation condition on the basis of an image of an original document. The log image generation condition is set (decided) in accordance with a type of the job, a job condition of the job, or the like. Examples of the job condition of a copy job include a color mode, an orientation of the original document, selection of a sheet, single-sided/double-sided copy, a magnification, a copy density, and a page aggregation. Examples of the job condition of a scan job include a color mode, a format (file format), a density of a character, adjustment of a background color, and page division. In a case where a plurality of images are handled by the job, however, the log image includes a plurality of images (pages).

For example, in a case where the color mode of the copy job is "monochrome (gray scale)" and the color mode of the scan job is "color", the log image of the scan job is a color image based on an image of the original document read by the image reading unit 158 and the log image of the copy job is an image subjected to color conversion (processing) into gray scale on the basis of the image of the original document. Note that, though detailed description will be omitted, also in a case of the job condition other than the color mode, the log image that is appropriately processed on the basis of the image of the original document in accordance with the job condition set in each of the jobs so as to correspond to a product of each of the jobs is generated.

As illustrated in FIG. 4, there is a case where, in addition to the scan job (first job), a FAX job (second job) and an I-FAX job (third job) each of which is a job (so-called image transmission job) in which image data is transmitted to another apparatus are simultaneously executed. The example illustrated in FIG. 4 indicates a case where so-called multicasting in which the same original document is transmitted to a plurality of transmission destinations collectively is performed. In this case as well, similarly to the example of FIG. 3 described above, for each of the scan job, the FAX job, and the I-FAX job, a job log that includes a log image and log information corresponding to the log image is generated.

In a case of the image transmission job, the log information includes, in addition to the information described above, information of a transmission destination or address (a user name, a mail address, a FAX number, or the like of the transmission destination) of image data, a file name, or the like. Though not illustrated, in a case where the document filing mode of the scan job is executed, the log information also includes, for example, identification information of an apparatus of a storage destination.

Image data of a color image is able to be transmitted or received in the I-FAX job, whereas only image data of a black-and-white binary monochrome image (black-and-white image) is able to be transmitted in the FAX job. Thus, the log image of the FAX job is an image converted (processed) into a black-and-white binary monochrome image at least on the basis of an image (color image) of the original document.

As described above, in the image forming apparatus 14 of the first exemplary embodiment, for each of a plurality of jobs, a job log that includes a log image and log information corresponding to the log image is generated. Data of the job log that is generated is transmitted from the image forming apparatus 14 to the server 12 and stored in the storage unit of the server 12.

The job log stored in the server 12 is able to be confirmed in the image forming apparatus 14. In a case where power of the image forming apparatus 14 is turned on and the image forming apparatus 14 is in a standby state where each of functions is able to be executed, the home screen 100 as illustrated in FIG. 5 is displayed on the display 154 of the image forming apparatus 14. On the home screen 100, an image of a software key (icon) by which each of jobs such as copy, print, FAX, and scan jobs is selected to display an operation screen (setting screen) in the job is displayed. On the home screen 100, an image of an icon (hereinafter, referred to as "system information icon") 102 to execute a confirmation function of system information, which includes confirmation of the job log, is also displayed.

In the image forming apparatus 14, when the system information icon 102 is touched (selected), the first selection screen 120 as illustrated in FIG. 6 is displayed on the display 154. The first selection screen 120 includes an icon display unit 122, a return icon 126, and an end icon 128.

A selection icon 124 to confirm the job log is displayed on the icon display unit 122 and a character string, a figure, or the like that is associated with conformation of the job log is displayed on the selection icon 124.

To the return icon 126, a function of closing the screen (first selection screen 120) that is currently displayed and returning to a previous operation screen is assigned. For example, when the return icon 126 is touched in the first selection screen 120, the home screen 100 is displayed on the display 154. The same is also applied to return icons 186 and 206 described below.

To the end icon 128, a function of ending the confirmation function of system information is assigned. For example, when the end icon 128 is touched, the screen (first selection screen 120) that is currently displayed is closed and the home screen 100 is displayed on the display 154. The same is also applied to end icons 188 and 208 described below.

When the selection icon 124 is touched in the first selection screen 120, the second selection screen 180 as illustrated in FIG. 7 is displayed on the display 154. The second selection screen 180 is a screen in which a job log to be confirmed by the user is selected from among job logs stored in the server 12 and includes a list display unit 182, the return icon 186, and the end icon 188.

On the list display unit 182, a list of a selection icon 184 corresponding to a job log that is able to be confirmed is displayed. On the selection icon 184, a thumbnail image based on a log image included in the job log, and a character string, a figure, or the like that is associated with log information are displayed. Note that, in a case where the log image includes a plurality of images, a thumbnail image based on an image of a first page (first sheet) is displayed on the selection icon 184. In the example illustrated in FIG. 7, a selection icon 184a corresponding to a first job log and a selection icon 184b corresponding to a second job log are displayed on the list display unit 182.

When the selection icon 184 is touched by the user in the second selection screen 180, the touched selection icon 184 is in a selected state. Note that, when the selection icon 184 is touched, a display form of the selection icon 184 changes as illustrated in FIG. 8. For example, a check mark 192 is displayed in or a pattern is applied to the touched selection icon 184 or the touched selection icon 184 is appropriately colored. This makes it possible for the user to recognize an icon selected by himself or herself.

When the selection icon 184 is in the selected state, a confirmation icon 194 and a deletion icon 196 are displayed on a right side of the second selection screen 180.

To the confirmation icon 194, a function of displaying a detailed content of a job log corresponding to the selection icon 184 in the selected state is assigned. Meanwhile, to the deletion icon 196, a function of deleting the job log corresponding to the selection icon 184 in the selected state is assigned. When the deletion icon 196 is touched, data of the job log corresponding to the selection icon 184 in the selected state is deleted and the selection icon 184 is not displayed.

When the confirmation icon 194 is touched, the confirmation screen 200 as illustrated in FIG. 9 is displayed on the display 154. The confirmation screen 200 is a screen including the content of the job log corresponding to the selection icon 184 selected in the second selection screen 180 and includes a log image display unit 202, a log information display unit 204, the return icon 206, and the end icon 208.

In the log image display unit 202, a log image of the job log (job log in the selected state) corresponding to the selection icon 184 selected in the second selection screen 180 is displayed. In a case where the log image includes a plurality of images, however, an image switch unit 210 is displayed on the log image display unit 202. The image switch unit 210 includes a first switch button 212, a second switch button 214, and a page information display unit 216. On the page information display unit 216, information about the number of images (pages) included in the log image, a page number of the log image that is currently displayed on the log image display unit 202, or the like is displayed. The first switch button 212 and the second switch button 214 are functional buttons (software keys) to which a function of switching the log image displayed on the log image display unit 202 is assigned. The first switch button 212 is arranged on a left side of the page information display unit 216. The second switch button 214 is arranged on a right side of the page information display unit 216.

When the first switch button 212 is touched, an image (next page) before the image that is currently displayed among the plurality of images included in the log image is displayed on the log image display unit 202. When the second switch button 214 is touched, an image (next page) after the image that is currently displayed among the plurality of images included in the log image is displayed on the log image display unit 202.

On the log information display unit 204, log information of the job log in the selected state is displayed. For example, log information such as a job execution user name, a job mode, a status, a start date, and an end date of the job log in the selected state is displayed on the log information display unit 204.

The operation of the information processing system 10 as described above is implemented when the CPU 142 of the image forming apparatus 14 executes an information processing program for the image forming apparatus 14, which is stored in the RAM 144. Specific processing will be described later with reference to a flowchart.

Figure 10:
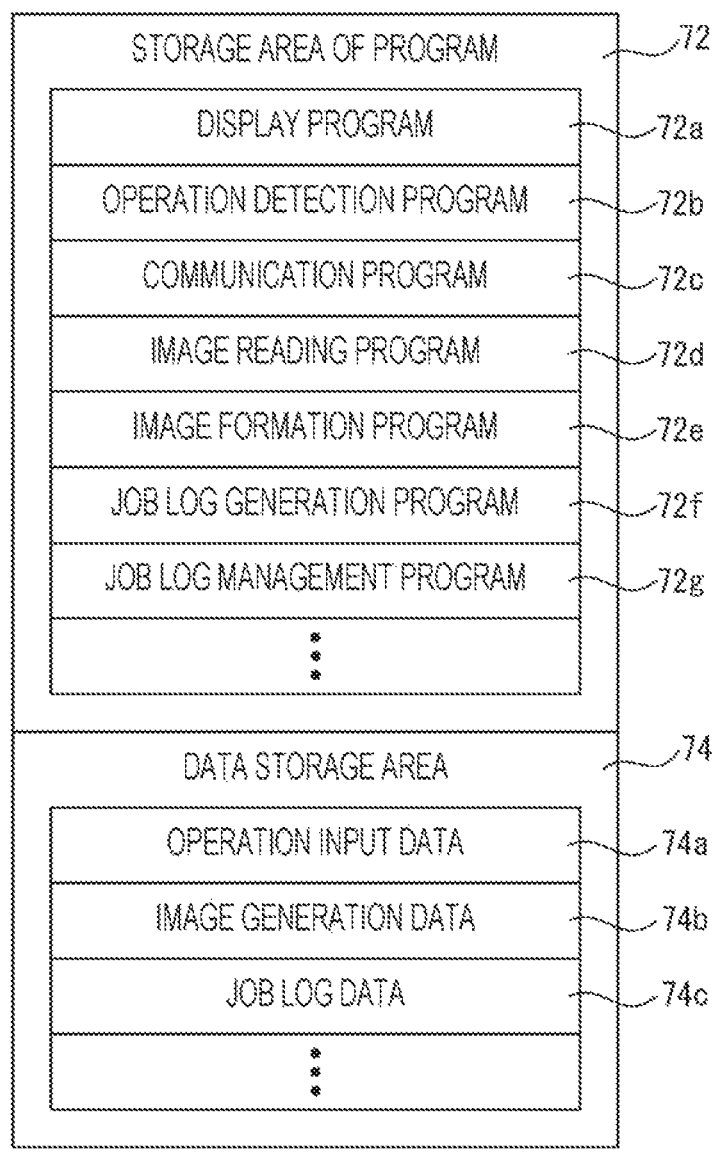
FIG. 10 is an explanatory diagram illustrating an example of a memory map of a RAM of the image forming apparatus illustrated in FIG. 2.

FIG. 10 is an explanatory diagram illustrating an example of a memory map 70 of the RAM 144 of the image forming apparatus 14 illustrated in FIG. 2. As illustrated in FIG. 10, the RAM 144 includes a program storage area 72 and a data storage area 74. In the program storage area 72 of the RAM 144, as described above, the information processing program for the image forming apparatus 14 is stored. The information processing program for the image forming apparatus 14 includes a display program 72a, an operation detection program 72b, a communication program 72c, an image reading program 72d, an image formation program 72e, a job log generation program 72f, and a job log management program 72g.

The display program 72a is a program by which display image data, that is, screen data of the home screen 100, the first selection screen 120, the second selection screen 180, the confirmation screen 200, or the like described above is generated by using image generation data 74b described below and output to the display 154.

The operation detection program 72b is a program by which a touch input is detected, and the CPU 142 stores touch coordinate data, which is acquired in accordance with the operation detection program 72b, in chronological order in the RAM 144. In a case where a hardware button is provided or a hardware keyboard is connected as described above, however, an input of the button or key is also detected in accordance with the operation detection program 72b.

The communication program 72c is a program by which data is communicated (transmitted or received) with another computer or another device such as the server 12 through the network.

The image reading program 72d is a program by which the image reading unit 158 is controlled to read (scan) an image of an original document placed on a document platen and to output an image signal (scanned image data) corresponding to the read image.

The image formation program 72e is a program by which the image forming unit 156 is controlled to form a multicolor or monochrome image on a sheet in accordance with print image data for image formation on the sheet. Note that, as the print image data, image data read by the image reading unit 158, image data transmitted from an external computer, or the like is used.

The job log generation program 72f includes a log information generation program and a log image generation program. The log information generation program is a program by which, when a job is executed in the image forming apparatus 14, information such as a job condition set in the job is acquired and log information included in a job log of the job is generated. The log image generation program is a program by which, when a job is executed in the image forming apparatus 14, a log image included in a job log of the job is generated in accordance with a type, a job condition, or the like of the job. Note that, log information and a log image that are related to the same job are stored in association with each other.

The job log management program 72g is a program by which the storage unit of the server 12 is accessed in response to an operation of the user and data of a job log stored in the storage unit of the server 12 is read out to display a content of the job log on the display 154 or delete the data of the job log.

Note that, though not illustrated, a transmission program by which data of a job log generated in accordance with the job log generation program 72f is transmitted (transferred) to the server 12 or image data read by the image reading unit 158 is transmitted to another computer such as the server 12, a FAX communication program by which the FAX communication unit 160 is controlled to perform FAX communication, an I-FAX communication program by which image data of I-FAX is transmitted or received, an electronic mail transmission or reception program by which an electronic mail is transmitted or received, a program by which various functions of the image forming apparatus 14 are selected and executed, and the like are also stored in the program storage area 72.

In the data storage area 74 of the RAM 144, operation input data 74a, image generation data 74b, job log data 74c, and the like are stored.

The operation input data 74a is data in which touch coordinate data detected in accordance with the operation detection program 72b is stored in chronological order. Note that, the operation input data 74a includes operation data related to a hardware button or key in some cases.

The image generation data 74b is data, such as polygon data or texture data, by which display image data corresponding to various screens displayed on the display 154 is generated.

The job log data 74c is data of a job log related to a job executed in the image forming apparatus 14 and includes data related to log information and image data related to a log image for the job executed in the image forming apparatus 14.

Note that, though not illustrated, in the data storage area 74, print image data for image formation on a sheet and other data used to execute the information processing program for the image forming apparatus 14 may be stored or a timer (counter) or a register that is used to execute the information processing program for the image forming apparatus 14 may be provided.

Figure 11:
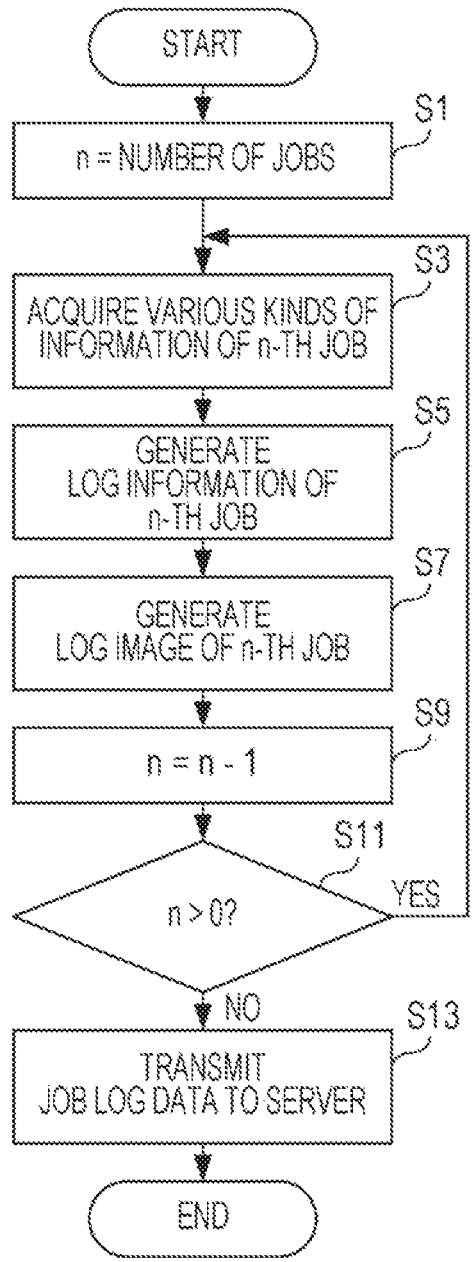
FIG. 11 is a flowchart illustrating an example of job log generation processing by a CPU of the image forming apparatus illustrated in FIG. 2.

Next, job log generation processing for a plurality of jobs executed in the CPU 142 of the image forming apparatus 14 will be described. FIG. 11 is a flowchart illustrating an example of the job log generation processing for a plurality of jobs in the CPU 142 of the image forming apparatus 14 illustrated in FIG. 2. Here, the job log generation processing for a plurality of jobs, which is illustrated in FIG. 11, is processing that starts in a case where a plurality of jobs are simultaneously executed, and in a case where a single job is executed, normal job log generation processing different from the job log generation processing for a plurality of jobs is executed. Note that, in the normal job log generation processing, a job log that includes log information and a log image for a single job is only generated, so that detailed description thereof will be omitted.

In a case where a plurality of jobs are simultaneously executed, the CPU 142 of the image forming apparatus 14 starts the job log generation processing for a plurality of jobs and substitutes the number of jobs that are simultaneously executed for a variable n at step S1, as illustrated in FIG. 11. At this time, the CPU 142 allocates job numbers (identification information) to the jobs in predetermined order.

Subsequently, various kinds of information of an n-th job are acquired at step S3. Note that, various kinds of information of a job include information to generate log information of the job and information to generate a log image of the job.

Next, log information of the n-th job is generated at step S5, a log image of the n-th job is generated at step S7, n−1 is substituted for the variable n at step S9, and whether the variable n is larger than 0 is determined at step S11. In a case of "YES" at step S11, that is, when the variable n is larger than 0, the procedure returns to step S3. On the other hand, in a case of "NO" at step S11, that is, when the variable n is 0 or less, a plurality of pieces of job log data including a log image and log information corresponding to the log image are transmitted to the server 12 at step S13 and the job log generation processing for a plurality of jobs ends.

Figure 12:
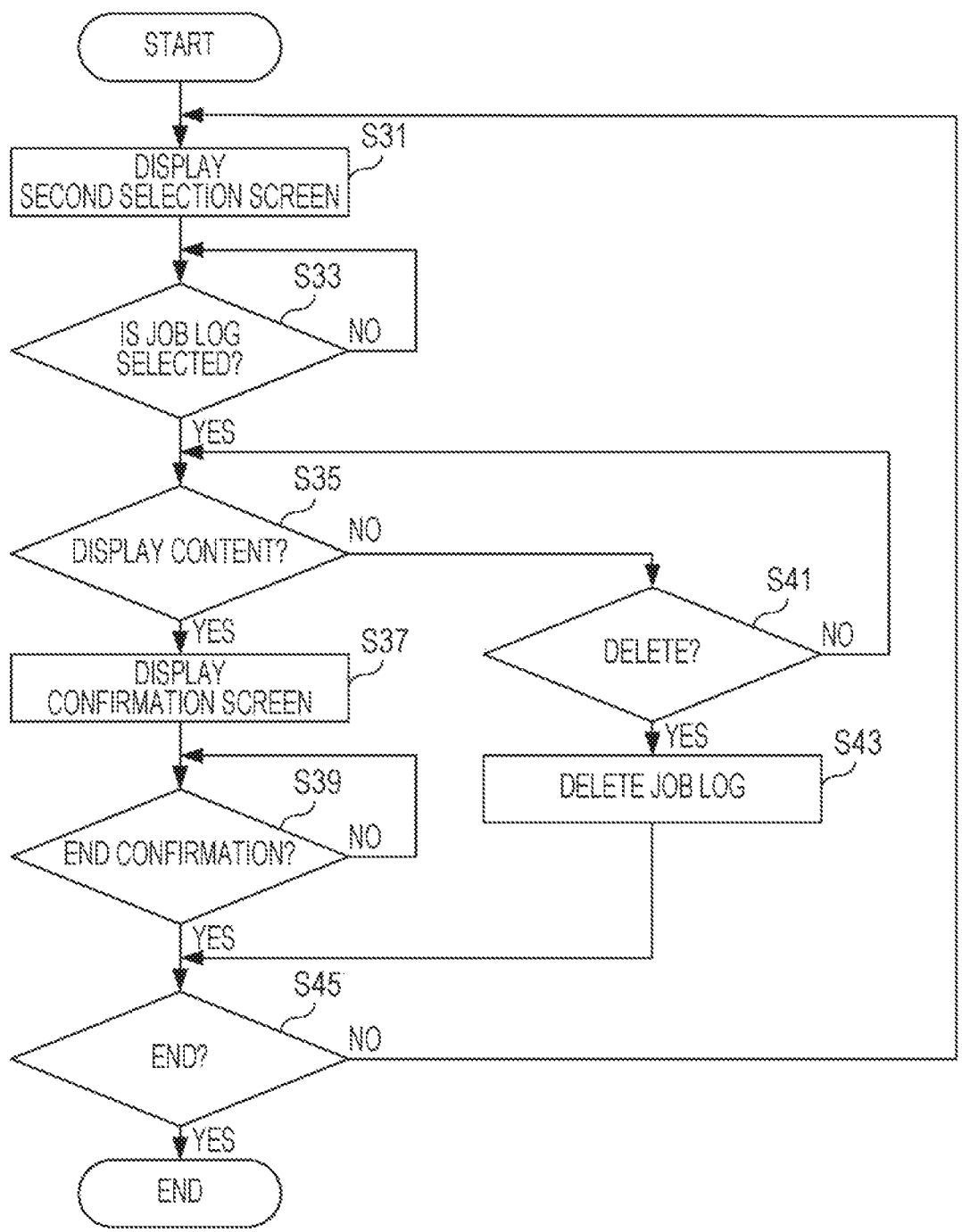
FIG. 12 is a flowchart illustrating an example of job log management processing by the CPU of the image forming apparatus illustrated in FIG. 2.

Next, job log management processing executed in the CPU 142 of the image forming apparatus 14 will be described. FIG. 12 is a flowchart illustrating an example of the job log management processing by the CPU 142 of the image forming apparatus 14 illustrated in FIG. 2.

When the selection icon 124 is touched in the first selection screen 120, the CPU 142 of the image forming apparatus 14 starts the job log management processing, displays the second selection screen 180 on the display 154 at step S31, and determines whether a job log is selected at step S33, as illustrated in FIG. 12. Here, whether the selection icon 184 is touched in the second selection screen 180 is determined.

In a case of "NO" at step S33, that is, when determining that a job log is not selected, the procedure returns to step S33. On the other hand, in a case of "YES" at step S33, that is, when determining that a job log is selected, whether to display a content of the job log in the selected state is determined at step S35. Here, whether the confirmation icon 194 is touched in the second selection screen 180 is determined.

In a case of "YES" at step S35, that is, when determining to display the content of the job log in the selected state, the confirmation screen 200 is displayed on the display 154 at step S37 and whether to end the display of the confirmation screen 200 is determined at step S39. Here, whether the end icon 208 is touched in the confirmation screen 200 is determined.

In a case of "NO" at step S39, that is, when determining not to end the display of the confirmation screen 200, the procedure returns to step S39. On the other hand, in a case of "YES" at step S39, that is, when determining to end the display of the confirmation screen 200, the procedure proceeds to step S45 described below.

In a case of "NO" at step S35, that is, when determining not to display the content of the job log in the selected state, whether to delete data of the job log in the selected state is determined at step S41. Here, whether the deletion icon 196 is touched in the second selection screen 180 is determined.

In a case of "NO" at step S41, that is, when determining not to delete the data of the job log in the selected state, the procedure returns to step S35. On the other hand, in a case of "YES" at step S41, that is, when determining to delete the data of the job log in the selected state, the data of the job log in the selected state is deleted at step S43 and the procedure proceeds to step S45.

At step S45, whether to end the job log management processing is determined. Here, whether the end icon 188 or the end icon 208 is touched is determined. In a case of "NO" at step S45, that is, when determining not to end the job log management processing, the procedure returns to step S31. On the other hand, in a case of "YES" at step S45, that is, when determining to end the job log management processing, the job log management processing ends.

In the first exemplary embodiment, in a case where a plurality of jobs are simultaneously executed in the image forming apparatus 14, history information that includes log information of each of the plurality of jobs and image data corresponding to an image handled by the job is generated. Thus, since a job log is appropriately generated for each of the jobs, it is possible to specify a leak source of information.

Moreover, in the first exemplary embodiment, a log image is an image processed in accordance with a log image generation condition of each of the jobs. Thus, since a log image matched with a product of each of the jobs is able to be generated, a leak source of information is easily specified.

[Second Exemplary Embodiment]

Since an information processing system 10 of a second exemplary embodiment is the same as that of the first exemplary embodiment except that at least a part of log information is embedded in a log image, a content different from that of the first exemplary embodiment will be described and redundant description will be omitted.

In the second exemplary embodiment, when a job log is generated, a part or all of information of log information is embedded in a log image as embedded information. Note that, in information included in the log information, the information embedded in the log image as the embedded information is set in advance.

For example, in a case where predetermined processing that does not appear in the log image is included in a job, information (additional information) about the predetermined processing is embedded in the log image as embedded information.

Examples of the predetermined processing that does not appear in the log image include paper folding processing of folding a sheet that has been subjected to image formation processing, book binding processing of automatically creating a book from a sheet bundle that has been subjected to image formation processing, staple processing of stapling a plurality of sheets, punch processing of punching a hole at a given position of a sheet, and cutting processing of cutting a small quantity of an output object when book binding processing is performed.

The additional information also includes information about a specific processing content in the predetermined processing. For example, additional information about paper folding processing includes information about a folding mode. Examples of a type of the folding mode of the paper folding processing include Z-folding, three roll folding, outer three folding, four roll folding, and half folding, and the like. Additional information about staple processing includes information about a staple position. Examples of a type of the staple position include one place on a front side, one place on a back side, and two places in a center.

Note that, the image forming apparatus 14 of the second exemplary embodiment includes a sheet post-processing unit and a discharge unit in addition to a main body of the apparatus, in order to execute predetermined processing as described above. In the image forming apparatus 14 configured in this manner, a sheet that has been subjected to image formation processing passes through the sheet post-processing unit from the image forming unit 156, and is then conveyed to the discharge unit. The sheet post-processing unit includes a paper folding unit, a saddle unit, and the like. The paper folding unit is able to perform paper folding processing. The saddle unit is able to perform book binding processing. The discharge unit includes a staple unit, a punch unit, and the like. The staple unit is able to perform staple processing. The punch unit is able to perform punch processing.

Figure 13:
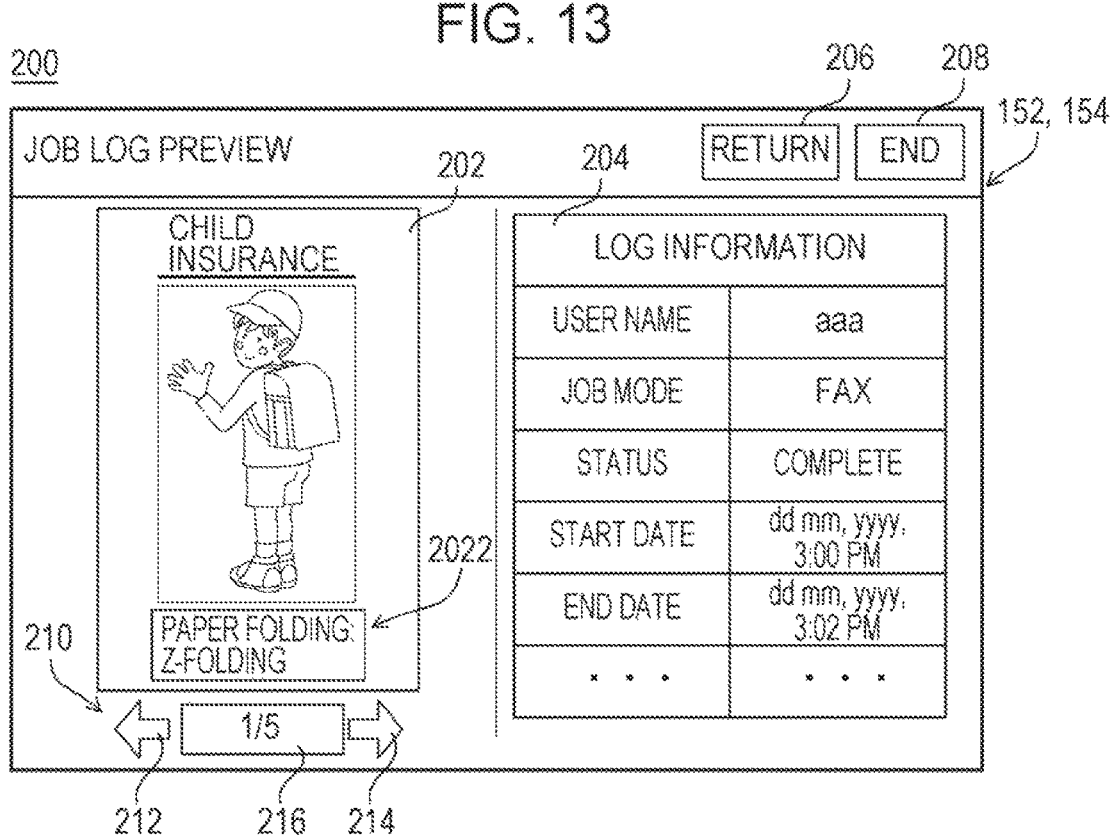
FIG. 13 is an explanatory diagram illustrating an example of a confirmation screen in a second exemplary embodiment.
Figure 14:
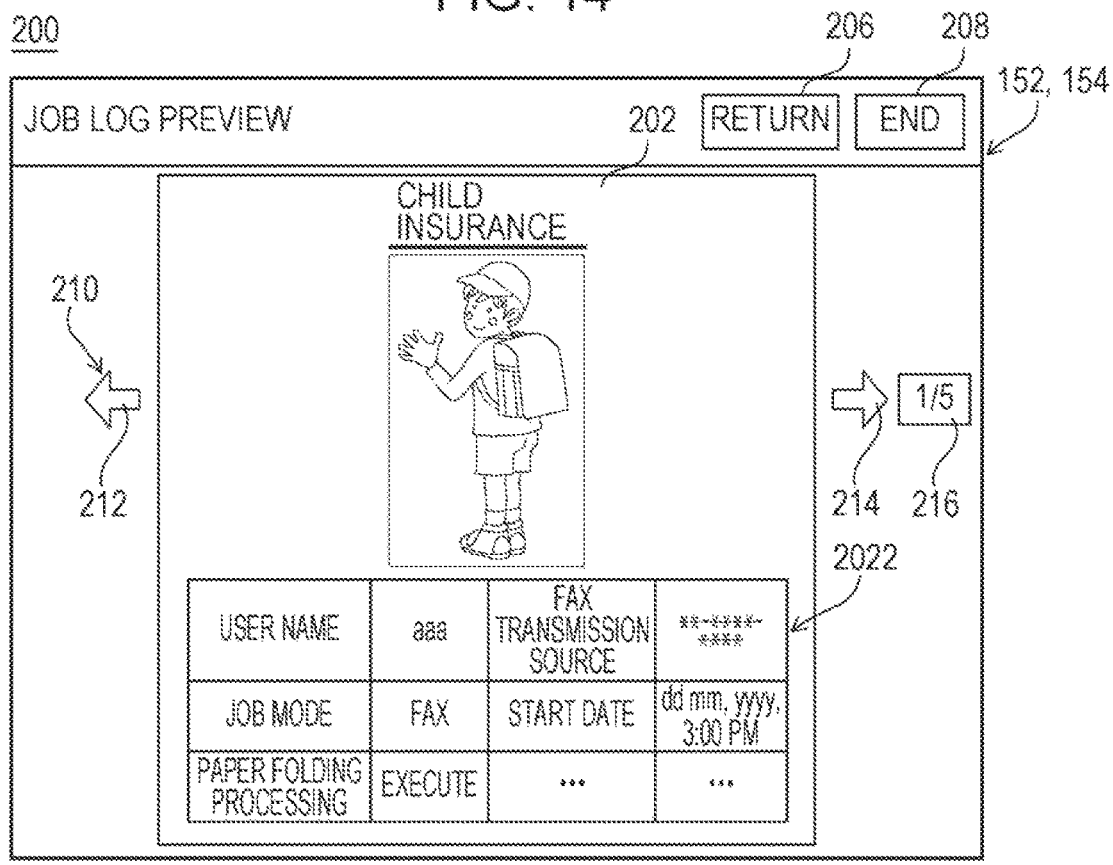
FIG. 14 is an explanatory diagram illustrating another example of the confirmation screen in the second exemplary embodiment.

FIG. 13 is an explanatory diagram illustrating an example of the confirmation screen 200 in the second exemplary embodiment. FIG. 14 is an explanatory diagram illustrating another example of the confirmation screen 200 in the second exemplary embodiment. As illustrated in FIG. 13, in the confirmation screen 200 related to a job in which paper folding processing is performed, a log image in which an embedded image 2022 that includes additional information about the paper folding processing is embedded is displayed. In this case, in the embedded image 2022, display indicating that the paper folding processing is performed, display of a character string related to a folding mode of the paper folding processing, or the like is performed.

In the example illustrated in FIG. 13, only additional information in information included in log information is embedded in a log image as embedded information. In this case, information other than the additional information in the information included in the log information is displayed on the log information display unit 204.

Further, as described above, information other than the additional information described above in the information included in the log information may be embedded in the log image as embedded information or all information included in the log information may be embedded in the log image as embedded information. For example, in a case of the image transmission job, at least information about a transmission destination (address) may be embedded in the log image as embedded information. In a case of the document filing mode of the scan job, information about a storage destination of image data may be embedded in a log image as embedded information.

In a case where all information included in log information is embedded in a log image as embedded information as illustrated in FIG. 14, however, the log information display unit 204 is omitted in the confirmation screen 200. Also in a case where log information includes information other than embedded information, the user may be allowed to perform setting about whether to display the log information display unit 204.

Though job log generation processing for a plurality of jobs in the second exemplary embodiment will be described below with reference to a flowchart, the same processing as that of the job log generation processing for a plurality of jobs described in the first exemplary embodiment will be given the same reference sign and a redundant content will not be described or will be briefly described.

Figure 15:
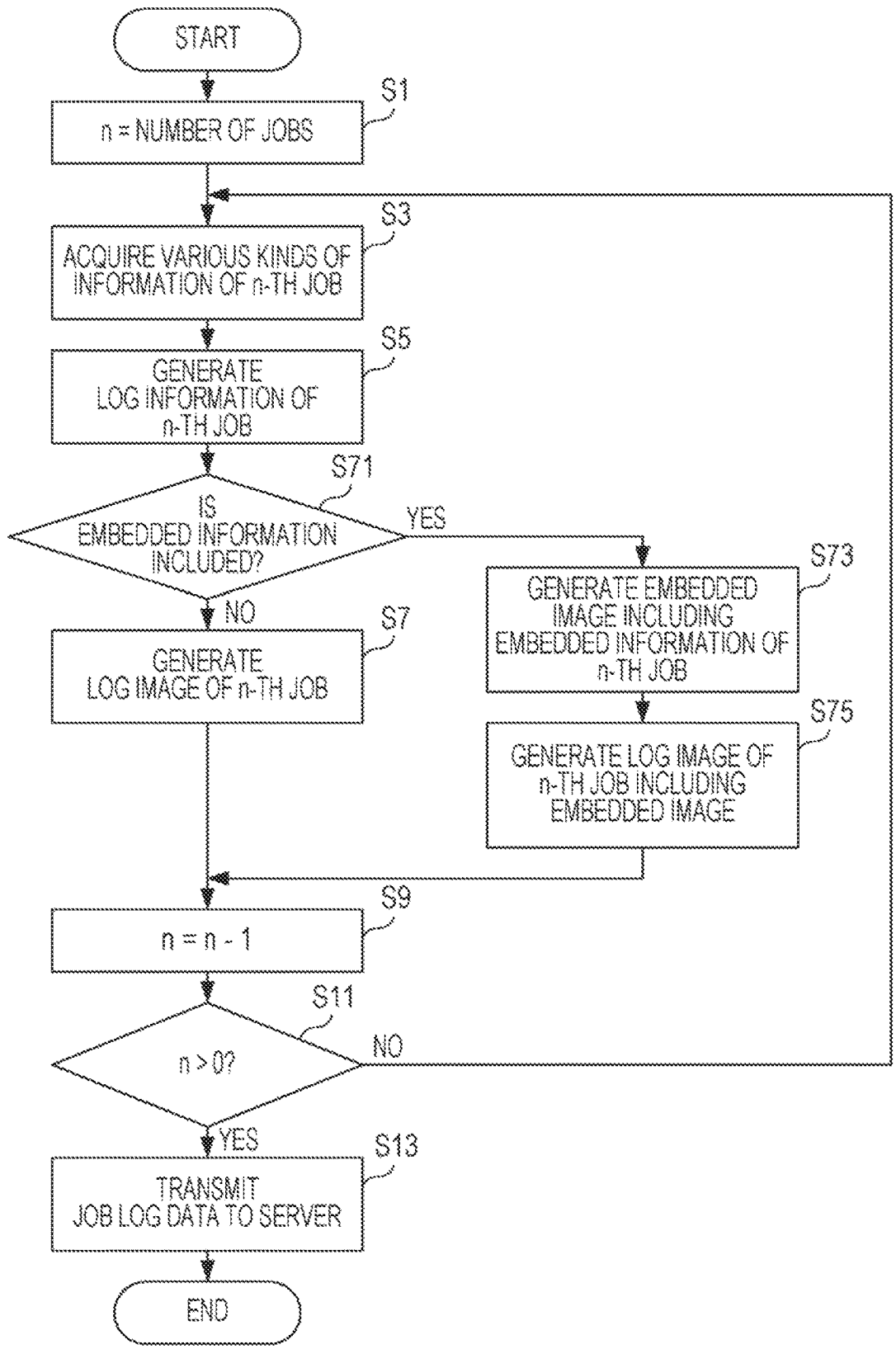
FIG. 15 is a flowchart illustrating an example of job log generation processing in the second exemplary embodiment.

FIG. 15 is a flowchart illustrating an example of the job log generation processing for a plurality of jobs in the second exemplary embodiment. As illustrated in FIG. 15, when the job log generation processing for a plurality of jobs starts, the CPU 142 of the image forming apparatus 14 generates log information of an n-th job at step S5 and determines whether the log information of the n-th job includes embedded information at step S71.

In a case of "NO" at step S71, that is, when determining that the log information of the n-th job does not include embedded information, the procedure proceeds to step S7. On the other hand, in a case of "YES" at step S71, that is, when determining that the log information of the n-th job includes embedded information, an embedded image corresponding to the embedded information of the n-th job is generated at step S73 and a log image that includes the embedded image of the n-th job is generated at step S75, and the procedure proceeds to step S9.

Note that, since a content of the processing of steps S1 to S13 is the same as that of the first exemplary embodiment, detailed description thereof will be omitted.

Next, job log management processing in the second exemplary embodiment will be described. FIG. 16 is a flowchart illustrating an example of the job log management processing in the second exemplary embodiment. As illustrated in FIG. 16, after the job log management processing starts, in a case of "YES" at step S35, the CPU 142 of the image forming apparatus 14 determines whether there is log information other than embedded information at step S91. That is, the CPU 142 determines whether a part of information included in log information is embedded information or whether all information included in log information is embedded information.

In a case of "YES" at step S91, that is, when determining that there is log information other than embedded information, that is, when determining that a part of information included in the log information is embedded information, the normal confirmation screen 200 is displayed on the display 154 at step S93 and the procedure proceeds to step S39. In this case, the normal confirmation screen 200 includes the log image display unit 202 and the log information display unit 204. On the other hand, in a case of "NO" at step S91, that is, when determining that there is no log information other than embedded information, that is, when determining that all information included in the log information is embedded information, the conformation screen 200 with only a log image is displayed on the display unit 154 at step S95 and the procedure proceeds to step S39. In the confirmation screen 200 with only the log image, however, the log information display unit 204 is omitted.

According to the second exemplary embodiment, since at least a part of log information is embedded in a log image, even when the user confirms only the log image, it is possible to specify a product of each job and specify a leak source of information.

According to the second exemplary embodiment, since additional information about predetermined processing that does not appear in an image is embedded in a log image, it is possible to appropriately specify a product of each job and it becomes easy to specify a leak source of information.

Note that, though data of a job log is transmitted from the image forming apparatus 14 to the server 12 and stored in the storage unit of the server 12 in the exemplary embodiments described above, there is no limitation thereto. For example, the data of the job log may be stored in the HDD 146 of the image forming apparatus 14 or may be stored in both of the storage unit of the server 12 and the HDD 146 of the image forming apparatus 14. Moreover, the data of the job log may be automatically deleted when a given period has lapsed after generation of the data or may be automatically deleted in order of old data when a data capacity of a storage destination of the data of the job log reaches a given data capacity or more.

Though it is enabled to confirm a job log in the image forming apparatus 14 in the exemplary embodiments described above, there is no limitation thereto. For example, it may be enabled to confirm a job log in an external computer (information terminal) including an image display function. The external computer is, for example, a tablet terminal, a smartphone, a desktop PC, a notebook (laptop) PC, or the like, and is configured to be able to access a storage destination (the storage unit of the server 12 or the HDD 146 of the image forming apparatus 14) of data of the job log.

The screens, specific configurations, and the like cited in the exemplary embodiments described above are only an example, and are appropriately changeable in accordance with actual products. The order of steps illustrated in each of the flowcharts indicated in the exemplary embodiments described above may be appropriately changed when the same effect is achieved.

The present disclosure contains subject matter related to that disclosed in Japanese Priority Patent Application JP 2018-019736 filed in the Japan Patent Office on Feb. 7, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
    a job execution circuitry capable of executing a plurality of types of jobs; and
    a history information generator that, in a case where a plurality of jobs is simultaneously executed in the job execution circuitry, generates history information that corresponds to each of the plurality of jobs and includes a log image and log information corresponding to the log image,
    wherein at least a part of the log information is embedded in the log image.

2. The image forming apparatus according to claim 1, wherein the history information generator generates the log image obtained by processing an image handled by each of the plurality of jobs in accordance with a log image generation condition of the job.

3. The image forming apparatus according to claim 1, wherein
    the job includes predetermined processing that does not appear in the log image,
    the log information includes additional information about the predetermined processing, and
    the additional information is embedded in the log image.

4. The image forming apparatus according to claim 1, further comprising a memory that stores data related to the history information generated in the history information generator.

5. The image forming apparatus according to claim 1, further comprising a transmitter that transmits, to an external server, data related to the history information generated in the history information generator.

6. A non-transitory computer readable storage medium storing a control program of an image forming apparatus that includes a job execution circuitry capable of executing a plurality of types of jobs,
    the control program causing a processor of the image forming apparatus to function as
    a history information generator that, in a case where a plurality of jobs is simultaneously executed in the job execution circuitry, generates history information that corresponds to each of the plurality of jobs and includes a log image and log information corresponding to the log image,
    wherein at least a part of the log information is embedded in the log image.

7. A control method of an image forming apparatus that includes a job execution circuitry capable of executing a plurality of types of jobs, the control method comprising:
    (a) in a case where a plurality of jobs is simultaneously executed in the job execution circuitry,
    generating history information that corresponds to each of the plurality of jobs and includes a log image and log information corresponding to the log image,
    wherein at least a part of the log information is embedded in the log image.

* * * * *